Sept. 24, 1968 S. A. COLGATE 3,402,598

NONDESTRUCTIVE MEASUREMENT OF MATERIAL STRENGTH

Filed Aug. 11, 1965

INVENTOR.
STIRLING A. COLGATE

BY *Brumbaugh, Free, Graves, & Donohue* his ATTORNEYS

United States Patent Office 3,402,598
Patented Sept. 24, 1968

3,402,598
NONDESTRUCTIVE MEASUREMENT OF
MATERIAL STRENGTH
Stirling A. Colgate, Socorro, N. Mex., assignor to Colgate
Research & Development Co., Princeton, N.J., a limited
partnership of New Jersey
Filed Aug. 11, 1965, Ser. No. 478,882
10 Claims. (Cl. 73—67.8)

ABSTRACT OF THE DISCLOSURE

Method and apparatus for the determination of the strength and interior characteristics of a material, in which pulses of ultrasonic pressure waves of controlled intensity are focused by a convex lens and transducer array at a small region, generally on the order of one cubic wavelength of the ultrasonic pressure wave, within the material whose properties are to be determined. The intensity of the generated pressure waves is gradually increased while the reflections of the pressure waves from the focal region are monitored. When the focused pressure waves are of an intensity sufficient to cause localized deterioration in the small region, an ultrasonic reflection is received by the transducers to generate a signal for display on a suitable instrument. At that instant, the known intensity of the pressure waves can be correlated to the strength of the material under test.

Specification

This invention relates to the nondestructive measurement of the mechanical strength of materials and, in particular, to an improved method and apparatus for determining the structural properties of materials by the use of intensified ultrasonic pressure waves.

Ultrasonic waves have been employed to determine various characteristics of materials. Among such uses are those in which the velocity of propagation of an ultrasonic wave through a medium is measured in order to calculate the modulus of the medium. Ultrasonics have also been used for the determination of the amount of stress existing in a metal test specimen. By transmitting an ultrasonic transverse (shear) wave through a test material and resolving the polarization of the shear wave in a receiver, the polarization components may be related to the stress existing in the test material.

Still another application of ultrasonic testing of materials has been the detection of discontinuities or flaws in solid materials, which reflect ultrasonic waves incident upon the flaw.

The measurement of the velocity of propagation of an ultrasonic wave in a test material requires complex equipment for accurately measuring the time between the transmitted and received signals propagated through the material. Although other known apparatus utilizing ultrasonics are capable of determining some of the properties of solid materials, they are incapable of measuring the actual stress at which failure occurs. Therefore, accurate measurement of the strength of materials has heretofore involved extremely complex and cumbersome devices or destructive testing, the latter being a time consuming process which often is not feasible.

The present invention provides a method and apparatus capable of determining the actual stress at which a test specimen will fail, and accordingly measures the strength of the specimen material. The invention achieves these results by generating compressional ultrasonic waves, focusing the ultrasonic waves within a small focal region inside the material whose properties are to be determined, and detecting pressure waves transmitted to and reflected from the focal region inside the material. In this way, the strength of the material may be determined from the intensity of the pressure waves required to produce ultrasonic waves reflected from the focal region.

Since the generated pressure waves are focused at a focal point within the test material, the intensity of pressure waves incident upon the focal point is many times greater than the intensity of each individual wave passing therethrough. Focusing pressure waves in this manner produces sufficient stress in the focal region to bring about localized failure or rupture of the material structure. If the waves are properly focused, the dimensions of the focal region of strain inside the material will be only approximately one cubic wave length of the ultrasonic pressure wave; thus, only a very small disturbance of the structure of the bulk specimen occurs. When the intensity of the pressure in the focal region exceeds the mechanical strength of the material, the material will not elastically transmit the ultrasonic pressure waves, and a nonlinearity in the elastic properties of the material sets up a reflected secondary wave which may be easily detected.

The desired application of amplified pressure waves may be accomplished by an apparatus providing a lens assembly having a focal point lying within the material whose properties are to be determined. The lens assembly includes means for generating ultrasonic compressional waves which are transmitted through the material and a solid lens in contact therewith.

Piezoelectric transducers may be used for generating the ultrasonic pressure waves, since vibrations generated by these transducers can be readily transmitted through a solid lens. The pressure energy transmitted through the lens into the material can be easily calculated, taking into account the known properties of the transducer and the geometry of the lens assembly.

Although the invention has been described briefly above, a better understanding of it may be gained from the following detailed description, taken in conjunction with the accompanying drawings, in which.

Figure 1:
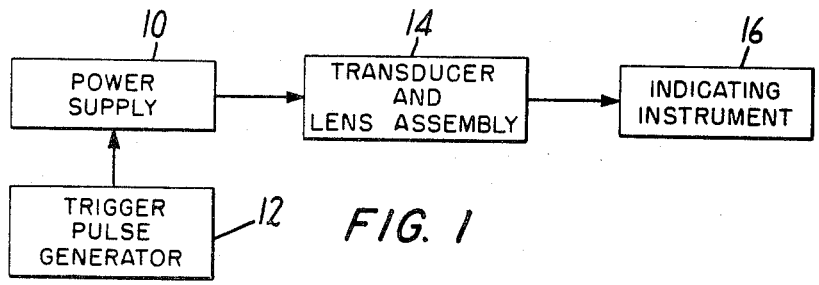
FIGURE 1 is a block diagram diagrammatically illustrating the invention.

Referring to a typical embodiment of the invention with reference to FIGURE 1, a power supply 10 controlled by a trigger pulse generator 12 supplies high voltage to a transducer and lens assembly 14 which generates ultrasonic waves. The lens assembly 14 is adapted to focus ultrasonic waves produced by the transducers into a focal region inside a material whose properties are to be determined. Reflected ultrasonic waves sensed by transducer and lens assembly 14 produce an indication on an instrument 16, which may be an oscilloscope or other suitable device.

Figure 2:
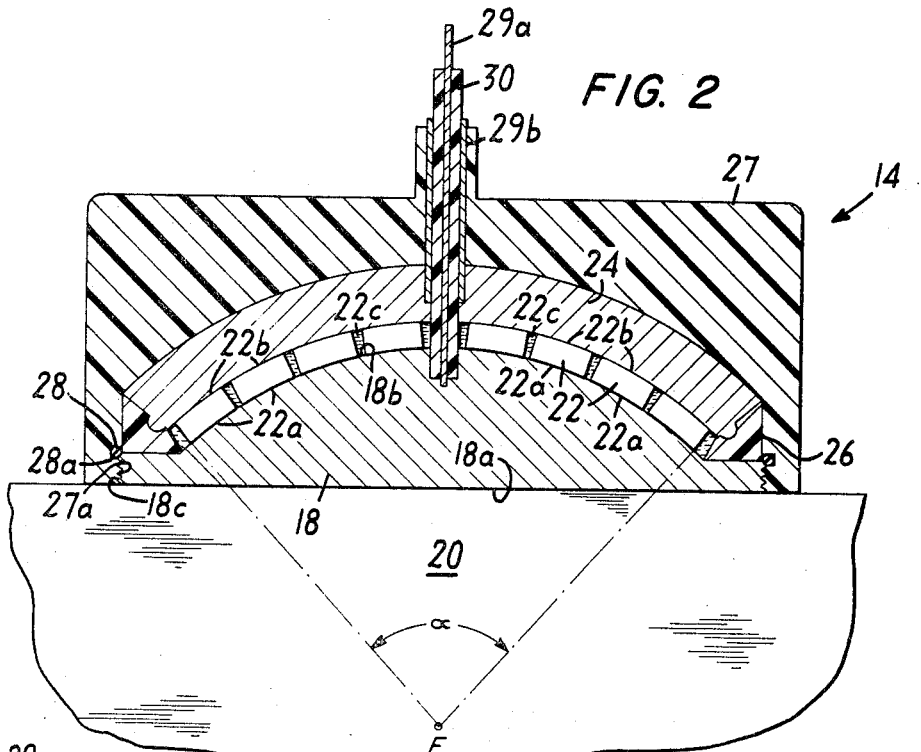
FIGURE 2 is a cross-section of a typical transducer and lens assembly embodying the invention.

Referring to FIGURE 2, a cross-section view of the transducer and lens assembly 14 illustrates in detail the components which function as explained above in connection with FIGURE 1. A solid convex-spherical lens 18, fabricated from a suitable material, for example steel, and juxtaposed with test material 20 in a manner to provide for efficient transmission of ultrasonic wave energy thereto across a plane face 18a thereof, supports a number of piezoelectric transducers 22 distributed on and conforming to a convex focusing surface 18b of the lens 18. The mosaic transducer shell formed by the transducers 22 cover substantially the entire convex surface 18b of the lens. A shell 24, formed of steel or some other suitable material, contacts the faces 22b of the transducers and is therefore spaced from the solid lens 18 approximately the thickness of the transducers. Interstices 22c between the individual transducers are preferably filled with an insulating medium such as oil.

Mechanical vibrations of the transducers 22, generated in response to an electric potential applied across their faces 22a, 22b, produce compressional waves which are imparted to and transmitted by the lens 18 to the material 20 under test where they converge at the focal point F. The transmitted compressional waves form at the focal point F a solid angle whose plane angle α should be between about 60° and about 120° in order to obtain optimum pressure amplification in the focal region.

Surrounding the edge of the shell 24 is an insulating ring 26 electrically isolating the two halves of the lens assembly. In the arrangement shown, the transducers may be affixed by suitable means to the lens 18 or the shell 24, or both.

A cover 27 constructed from an insulative material, such as plastic, is fastened by threads 27a to mating threads 18c on the periphery of the lens 18 to encase the lens assembly. This provides a readily portable device with its metal parts insulated to minimize shock hazards. A sealing ring 28 in a peripheral groove 28a in the cover 27 seals the lens assembly and prevents oil leakage.

To ensure efficient propagation of the ultrasonic waves to the test material 20, a couplant is commonly used between the solid lens 18 and the test material 20. Typical materials which may be used as a couplant are oil, water, grease, or the like.

Where the surface of the material to be tested is irregularly shaped, or would not adapt to the plane surface of a focusing lens such as the one illustrated, the non-focusing surface of the lens can be made to conform to the test material. Alternatively, the lens can be provided with a pliant adaptor (not shown) to fit between the non-focusing lens surface and the surface of the test material and constructed from a material having good propagation characteristics.

The transducers 22 can be formed of any suitable piezoelectric material. Ceramic transducers, such as barium titanate or PZT (available from the Clevite Brush Company of Cleveland, Ohio), have excellent piezoelectric properties and are preferred. The wavelength of ultrasonic waves generated by the transducers is selected by taking into consideration the particle size of the material to be tested. In general, this wavelength will be no shorter than the particle dimension. Because the particle size of metals does not vary substantially from metal to metal, most metals may be tested satisfactorily by a single wavelength. Materials such as concrete, for example, require a longer wavelength, owing to their larger particle size. The thickness of the transducers 22 determines the wavelength generated, such wavelength being approximately twice the transducer thickness.

It is well known that most materials are able to withstand stresses in excess of the critical yield stress for short periods of time. Generally, if a stress in excess of the critical stress for the material is applied for a duration of approximately one microsecond or longer, the material will yield. Athough this duration is not critical, an increase in the ultrasonic wave frequency requires an increase in the compressional wave intensity concomitantly in order to obtain localized yielding of the test material in the focal region. A frequency of one megacycle or less, therefore, is preferable to frequencies higher than one megacycle.

The waves produced by the piezoelectric transducers 22, having a frequency determined by the thickness of the transducers and the propagation characteristics thereof, are longitudinal, or compressional, waves in which the particle motion of the medium through which the wave travels is parallel to their direction of travel. These are distinguished from transverse, or shear, waves which have transverse particle motion in a direction perpendicular to the direction of propagation.

To generate sound waves, a high voltage is applied between the shell 24 and the lens 18 through electrodes 29a and 29b (FIGURE 2). Each electrode electrically contacts one side of the lens assembly, electrode 29a contacting the lens 18, and the concentric electrode 29b contacting the shell 24. Separating the electrodes 29a, 29b is an insulating cylinder 30. The high voltage impressed across these electrodes charges and stresses the transducers 22, and when the applied voltage is rapidly discharged, a "sound" wave is generated and launched in the lens 18. The energizing voltage must be discharged more rapidly than the time taken by a sound wave to travel across the thickness of the transducer. For example, if the speed of sound in the transducer material is $4.5 \times 10^3$ meters per second, and if the thickness of the transducers is 2 millimeters, then the energizing voltage across the electrodes 29a and 29b must be discharged approximately within .4 microsecond.

Figure 3:
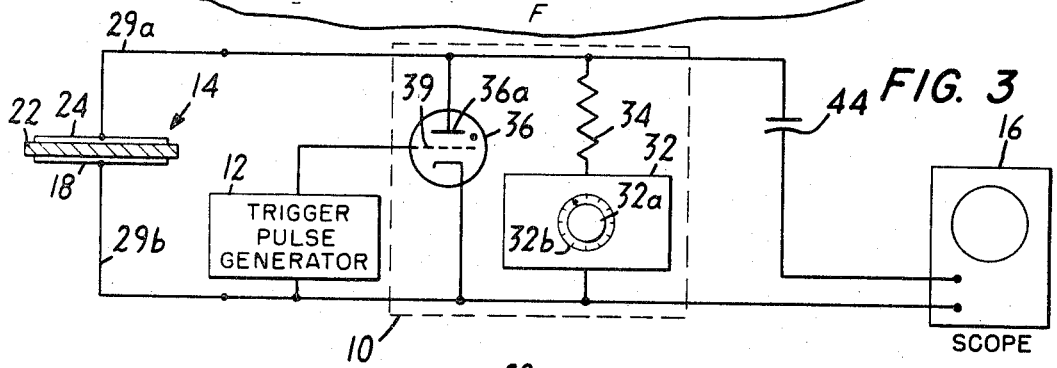
FIGURE 3 is a circuit diagram for use with the device of FIGURE 2.

FIGURE 3 shows a circuit suitable for activating the transducers. A variable source of high voltage 32 having its output regulated by a control knob 32a surrounded by a scale 32b supplies a high voltage to the transducers 22 through a damping resistor 34. This applied voltage sets up a strong electric field between the shell 24 and the lens 18 to stress the transducers. When the electric field is rapidly removed, the electrically stressed transducer relaxes, producing a compressional "sound" wave in the ultrasonic frequency range. The high voltage is also applied across an ignitron or thyratron 36 which fires to discharge the voltage across the transducers when triggered by the pulse generator 12 connected to its control element 39. The trigger pulse frequency (i.e., the sound wave repetition rate) can be selected to permit continuous sounding of the test material 20 as the power supply voltage is varied. Typically, a frequency of several cycles per second may be used.

Voltage selected by the knob 32a is supplied through the resistor 34 to the electrodes 29a and 29b of the lens assembly 14 and appears across the transducers 22. When a pulse appears at the control element 39 of the ignitron, the ignitron fires, discharging the voltage across the transducers 22. The ignitron 36 then presents a very low impedance to both the transducers 22 and the power supply 10. Thus, most of the power supply voltage will appear across the resistor 34, placing the anode 36a at a potential insufficient to maintain ignitron conduction once the transducers are discharged. The ignitron is therefore extinguished, and the transducers 22 again begin to charge to the full selected power supply voltage.

An indicating instrument, such as an oscilloscope 16, can be used to observe the transmitted or test pulses and reflected pulses. A capacitor 44 connected in series with one of the scope leads blocks the direct-current power supply voltage and couples the transducer transient signals, viz, the transmitted and received pulses, to the scope 16 where their indications are displayed.

When testing, the knob 32a is slowly rotated from its minimum position to select increasingly higher potentials. Until localized failure of the test specimen occurs, the scope 16 presents an indication 50 (see FIGURE 4) of an electrical signal corresponding to the transmitted sound wave. When the strength of the applied voltage is sufficient to produce the generation of waves of intensities in excess of the material yield strength, an indication 51 of a second electrical signal, representative of a wave reflected from the focal region F, appears. At this instant the voltage required to produce the reflected wave may be read from the scale 32b and its magnitude correlated to the sound wave pressure, as more fully explained below. By periodically applying (and discharging) the potential across the transducers 22, a continuous indication is obtained on the scope 16 or other recording or indicating instrument, permitting observation of the reflected wave at the instant of localized failure.

In the focusing arrangement provided by the lens assembly of FIGURE 2, the intensity of the ultrasonic sound waves generated by the mosaic transducer shell will be amplified in accordance with the square of focus ratio $f$ for the lens, the focus ratio being defined as the ratio of the radius of lens curvature $r$ to the wavelength. For example, if the focus ratio is 10:1, the strength of pressure waves generated at the surface of the solid lens 18 will be amplified by a factor of $f^2$, or 100. Outside the region of focus, therefore outside the region of intensified stress, the compressional wave intensity will be less than that required to cause failure of the test material 20; inside the small region surrounding the focal point F, the compressional force is sufficient to bring about a yielding of the material.

When the test material 20 yields, the propagation characteristic of the material is altered, and the compressional waves transmitted through the focal region are no longer proportional to the waves incident thereupon. When this occurs, a portion of the wave or waves incident upon the focal region will be reflected back to the lens 18 and transducers 22, or a separate receiving transducer (not shown) suitably located in the lens assembly.

Figure 4:
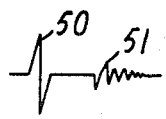
FIGURE 4 is an illustrative graph indicating representative transmitted and reflected ultrasonic pulses.

The receiving transducer, of course, will generate an electric signal corresponding to the reflected wave. Electric signals typical of the type observed on the oscilloscope 16 are illustrated in the graph of FIGURE 4. Until the material yield stress is reached, an indication of the electrical transmitted wave signal 50 appears on the scope, recurring at the pulse frequency rate. The presence of the reflected wave signal 51, displaced in time from the transmitted wave signal 50 by $2r/C$, where C is the velocity of sound through the test medium, represents a rupture or yielding of the test material.

Where the sound speeds of the test material 20 and the lens are identical, the compressional sound wave is transmitted to the test material without dispersion or refraction. If, on the other hand, the sound speeds are different, reflected and shear components of the compressional wave will be present. The shear component brings about lateral oscillations of the lens 18. These oscillations will be absorbed by the friction between the lens and test material surfaces. The reflected component, being considerably smaller than the launch sound wave, will result in some inefficiency of transmission across the lens surface 18$a$ and may be taken into account in computing the pressure in the focal region, as explained below.

Knowing the voltage (as indicated on the scale 32$b$ of the high voltage power source 32) applied across the transducers 22 and their electromechanical characteristics, the force causing localized failure of the material at the focal region may be calculated from the following relationship.

$$P = f^2 \cdot F \cdot E \quad (1)$$

where P is the pressure in lbs./inch$^2$, $f$ is the focus ratio (dimensionless) of the lens, F is the force factor of the piezoelectric transducers in lbs./volt-inch, and E is the strength of the electric field applied across the transducer in volts/inch. If, as discussed above, there are shear and reflected components of the compressional wave, they can be taken into account in expression (1) by the corrective factor $\gamma$, where $\gamma$ is the efficiency of wave transmission to the test specimen. Expression (1) then becomes $$P = \gamma f^2 \cdot F \cdot E \quad (2)$$

Using barium titanate transducers having a thickness of 2 millimeters and applying a 10,000 volt potential across the transducers, an amplified force of $7 \times 10^5$ lbs./inch$^2$ is realizable at the focal region for a lens focus ratio of ten. At a wave frequency of one megacycle, for example, this force is well above the strength of most materials.

The invention thus provides a method and apparatus for the nondestructive and reliable testing of a wide variety of materials. In addition, no complex equipment or elaborate testing techniques need be employed to obtain an accurate determination of material yield strength.

The embodiment of the invention described herein is illustrative only, and many modifications and variations can be made by one skilled in the art without departing from the spirit and scope of the invention. Accordingly, all such variations and modifications are intended to be included within the scope of the appended claims.

I claim:

1. Apparatus for determining the strength of materials, comprising a lens adapted to be juxtaposed with a material whose strength is to be determined, said lens providing a focusing surface of which the focal point is located within a focal region within the material when the lens is in juxtaposition with the material, a shell in spaced relation to the focusing surface of the lens, a plurality of ultrasonic transducers disposed between the focusing surface and the shell, means to apply an electric potential of suitable duration and known amplitude across the transducers to generate pulses of ultrasonic pressure waves which are focused and transmitted by the lens, and means to vary the amplitude of said electric potential to vary the intensity of the generated pressure waves by known amounts, said transducers being responsive to the pressure waves which are reflected from the focal region to develop an electrical signal when the intensity of the transmitted pressure waves is great enough to cause localized failure of the material at the focal region.

2. Apparatus in accordance with claim 1, wherein the pressure waves focused by said lens form a solid angle whose plane angle is from about 60° to 120°.

3. Apparatus according to claim 1, further comprising means responsive to the electrical signal from the transducers for indicating the occurrence of localized failure of the material.

4. Apparatus according to claim 1, further comprising a liquid insulating medium disposed between the lens and shell in the interstices between transducers.

5. Apparatus according to claim 1, further comprising cover means constructed of an insulative material, the cover means being complementary to and fitting over said shell for attachment to said lens.

6. Apparatus for determining the strength of materials, comprising a solid lens providing a focusing surface having a focal point located at a focal region within a material whose strength is to be determined, a shell in spaced relation to the focusing surface of the lens, a plurality of ultrasonic transducers disposed between the focusing surface and the shell, means to apply a periodic electric potential of known amplitude across the transducers to generate pulses of ultrasonic pressure waves which are focused and transmitted by the lens, means associated with the lens to provide for efficient transfer of the pressure waves from the lens to the material with which the lens is adapted to be juxtaposed, and means to vary the amplitude of said electric potential to vary the intensity of the generated pressure waves by known amounts, said transducers being responsive to the pressure waves which are reflected from the focal region to produce an electrical reflection signal when the intensity of the transmitted pressure waves is great enough to cause localized failure of the material at the focal region.

7. A method for determining the strength of materials comprising the steps of generating pulses of ultrasonic pressure waves of controlled intensity, focusing the pressure waves at a small region within the material whose properties are to be determined, increasing the intensity of the generated pressure waves by known amounts until the intensity of the transmitted pressure waves is great enough to cause localized failure of the material at the region, and detecting ultrasonic pressure waves reflected from the region upon localized failure of the material.

8. A method according to claim 7 wherein said region is a cubical volume whose sides are equal to the wavelength of the compressional waves.

9. A method in accordance with claim 7 wherein the cyclic frequency of the compressional wave is less than about one megacycle per second.

10. A method as defined in claim 7, in which the ultrasonic pressure wave pulses occur at a rate which is substantially less than the cyclic frequency of the transmitted ultrasonic pressure waves.

References Cited

UNITED STATES PATENTS

| | | | |
|---|---|---|---|
| 2,632,634 | 3/1953 | Williams | 310—8.7 XR |
| 3,233,449 | 2/1966 | Harmon | 73—67.8 |
| 3,233,450 | 2/1966 | Fry | 73—67.8 |

RICHARD C. QUEISSER, *Primary Examiner.*

JOHN P. BEAUCHAMP, *Assistant Examiner.*